O. D. PADRICK.
Self Propelling Vehicle.

Patented July 21, 1868.

Witnesses:
R. S. Campbell.
J. H. Campbell.

Inventor:
O. D. Padrick.
by Mason, Fenwick & Lawrence.

O. D. PADRICK.
Self Propelling Vehicle.

Patented July 21, 1868.

Witnesses:

Inventor:
O. D. Padrick
by
Mason, Fenwick & Lawrence

United States Patent Office.

OSCAR D. PADRICK, OF SHELBYVILLE, INDIANA.

Letters Patent No. 80,206, dated July 21, 1868.

---

IMPROVEMENT IN SELF-PROPELLING VEHICLE.

---

The Schedule referred to in these Letters Patent and making part of the same.

---

TO ALL WHOM IT MAY CONCERN:

Be it known that I, OSCAR D. PADRICK, of Shelbyville, in the county of Shelby, and State of Indiana, have invented a new and improved Self-Propelling Vehicle; and I do hereby declare that the following is a full, clear, and exact description thereof, reference being had to the accompanying drawings, making a part of this specification, in which—

Similar letters of reference indicate corresponding parts in the several figures.

This invention relates to certain novel improvements on self-propelling vehicles, or vehicles which are provided with springs, which, when wound up, will operate to turn the wheels of the vehicles, and thus propel them over roads without horses.

The nature of my invention and improvement consists in so constructing the propelling-mechanism that it can be readily applied to any common vehicle without considerable alteration or change thereof, and when desired it can be readily removed from the vehicle; and in employing a winding-up device for the springs, which afford the motive-power, which device is located in a convenient position to the seat of the vehicle, so that a person can wind up the springs whenever it is necessary, without leaving his seat, as will be hereinafter explained.

The invention provides for the use of stopping and starting-devices, which are placed under the control of a person sitting in the vehicle, in conjunction with propelling-devices, which are constructed and applied to a vehicle, as will be hereinafter described.

Provision is also made for allowing a person riding in a vehicle, which is propelled by springs, to guide and control its movements over the ground, as will be hereinafter explained.

To enable others skilled in the art to understand my invention, I will describe its construction and operation.

In the accompanying drawings, I have represented my improved propelling, guiding, and stopping and starting-devices applied to a common four-wheel buggy, having two seats, $A^1$ $A^2$, applied to its body A. This body A is mounted upon elliptic springs, $d\ d'$, which are supported upon the axle C C' of the transporting-wheels B B'. The front axle, C, is attached to the bolster at the front end of the reach D, by means of a king-pin, $b$, which will allow this axle to be turned either to the right or left for guiding the vehicle. A bar, $a$, is applied rigidly to the front axle, C', so as to project forward thereof a suitable distance to have attached to it the bifurcated end of a lever, $a^1$, which lever extends upward, and is bent backward and passed through an opening, $c$, and in rear of the front seat $A^2$. This lever $a$ is pivoted by a vertical pin, $b$, to the body A, and its rear hinged extension, $a^2$, is carried back so as to be convenient to a person sitting upon the seat $A^1$. By means of the lever and its axle-bar, applied as above stated, a person sitting upon the seat $A^1$ can guide the vehicle wherever he may desire.

Figure 1:
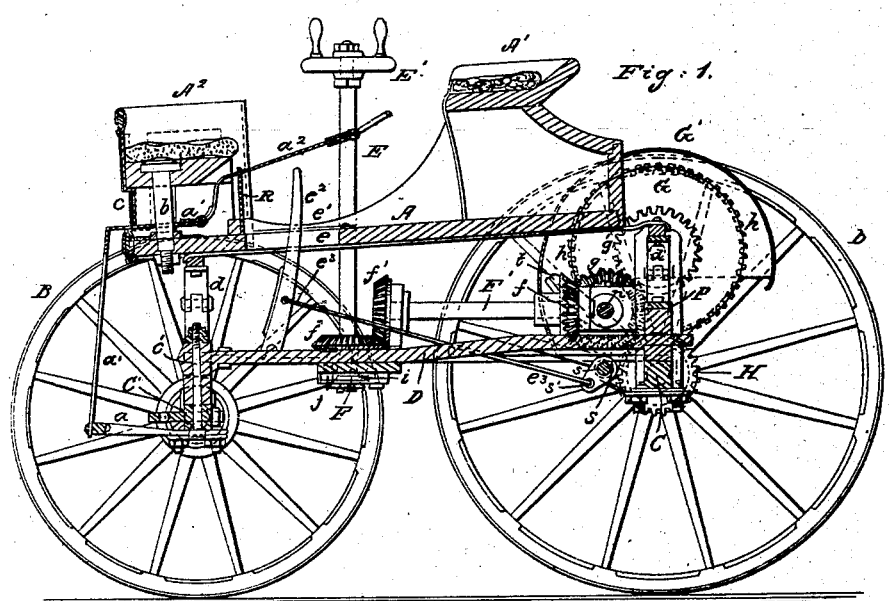
Figure 1 is a vertical section, taken longitudinally through the centre of a vehicle having my improved propelling and guiding-attachments upon it.
Figure 2:
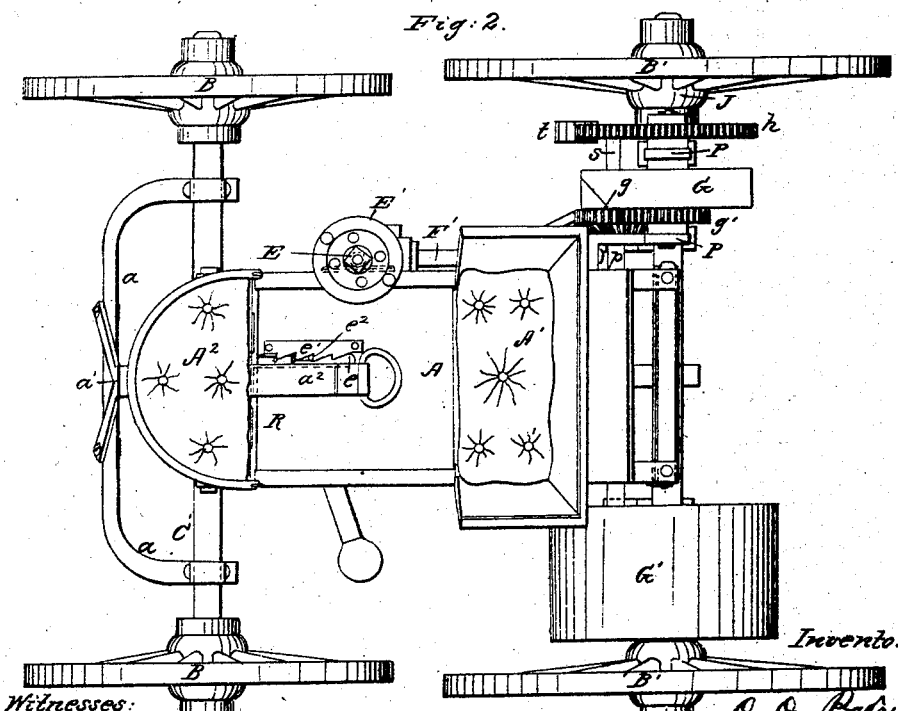
Figure 2 is a top view of the vehicle and improved attachments.

The notched plate R, shown in figs. 1 and 2, beneath the hinged extension $a^2$ of the guiding-lever, is designed for receiving said lever-extension, and locking the lever and the axle C' in any desired position.

Figure 4:
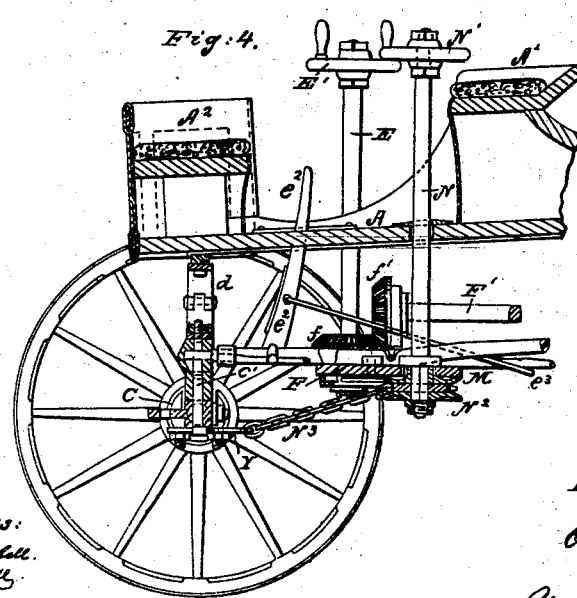
Figure 4 is a vertical section in detail, showing a modification of the guiding-device represented in figures.

Instead of using a lever for guiding the vehicle, as above described, a contrivance shown in fig. 4 may be employed. This consists of a vertical shaft, N, which is supported by a plate, M, fastened to the reach and reach-braces, and extended up through the bottom of the body A a suitable height. On the lower extremity of this shaft N is a chain-wheel, N², around which a chain, N³, passes, the ends of which are attached to eye-pieces Y, fastened to the axle C'. By taking hold of the hand-wheel N¹ and turning shaft N, the axle C' can be turned about the king-pin b, and the vehicle guided in any desired direction.

If at any time it is desired to employ a horse for drawing the vehicle, the guiding-devices can be readily detached, and thills or a draught applied in proper position.

To the inner ends of the hubs J of the rear wheels B', spired rings H are suitably secured, forming spurred wheels for engaging with the teeth of larger spurred wheels, h h. Each one of the wheels h is applied upon a short shaft, n, which shaft has its bearings in standards P P, that are notched over and bolted to the axle C' in a rigid manner. Upon each one of the shafts n, a drum or cylindrical case, G, is placed loosely, containing a spring, S, which is secured at its ends to the said case G and to the shaft n, so that by turning said drum around its shaft, the spring S will be wound up and operate to turn the wheel B' through the medium of the wheels H and h. On the inner side of each spring-case G, a spur-wheel, g', is fastened so as to turn with this case, and to turn loosely around the shaft n. The two spur-wheels, on the spring-cases G G, engage with spur-wheels g g, which are keyed to a horizontal transverse shaft, p, which shaft has its bearings in projections formed on the two inner standards P P.

One of the wheels g, on shaft p, has bevelled teeth formed on it, which engage with a bevel-spur wheel, $f^2$, which is keyed on the rear end of a longitudinal shaft, F', supported by an extension of one of the standards P, at its rear end, and by a perpendicular portion of a transverse plate, F, at its front end. The bevel-spur wheel $f^1$, on the front end of said shaft F', engages with the teeth of a bevel-wheel, f, which is keyed on a vertical rod, E, carrying on its upper end a hand-wheel, E', as clearly shown in fig. 1.

The rod and hand-wheel, just described, are arranged on one side of the body A in a convenient place to a person sitting upon the seat A¹; and on the lower end of the rod E, beneath the supporting-plate F, a ratchet-wheel, J, is keyed, the teeth of which engage with a spring-pawl, i, which prevents the rod F from turning but in one direction.

The supporting-plate F is secured to the reach D and its braces by means of staples and nuts, so that when desired, this plate, together with the several parts which it carries, the standards P P, and also the devices which they support, can be readily detached from the rear axle C', when it is desired to employ a horse for drawing the vehicle.

For the purpose of starting, stopping, and regulating the speed of the vehicle, I employ brakes, t, which are applied to the upturned ends of a rocking-rod, s, so that they can be pressed against the periphery of the wheels h h. The rod s extends across in front of the axle C', and is supported by brackets, projecting from the straps q of the standards P. To the middle of the length of the rod s, an arm, s', is secured, the free end of which is connected to a lever, $e^2$, by means of rod $e^3$, so that by vibrating this lever, the brake-shoes can be applied to or removed from the wheels h. Lever $e^2$ is pivoted, in a suitable manner, to the reach D, in front of plate F, and extends up through an oblong slot, e, made through the bottom of the body A, so that it can be vibrated by the foot or hand of a person upon the seat A¹.

A notched plate, $e^1$, is secured to the bottom of the body A, so that its teeth will project beyond one edge of the slot e, and serve as a means for catching and holding the lever $e^2$ when drawn back.

It will be seen from the above description that the propelling, guiding, and stopping and starting-devices can all be readily detached from the vehicle, when desired to use a horse for drawing it; and it will also be seen that with a very slight change in a common buggy or other four-wheel carriage, the said devices can be readily applied to such vehicle.

By means of the propelling-devices, which I have shown and described, a person sitting upon the seat A¹ can wind up the springs S simultaneously, and keep these springs properly wound up; and this can be done when the vehicle is in motion or at rest. The springs operate independently of each other upon the two driving and transporting-wheels, and they are arranged so as to be entirely out of the way.

Figure 3:
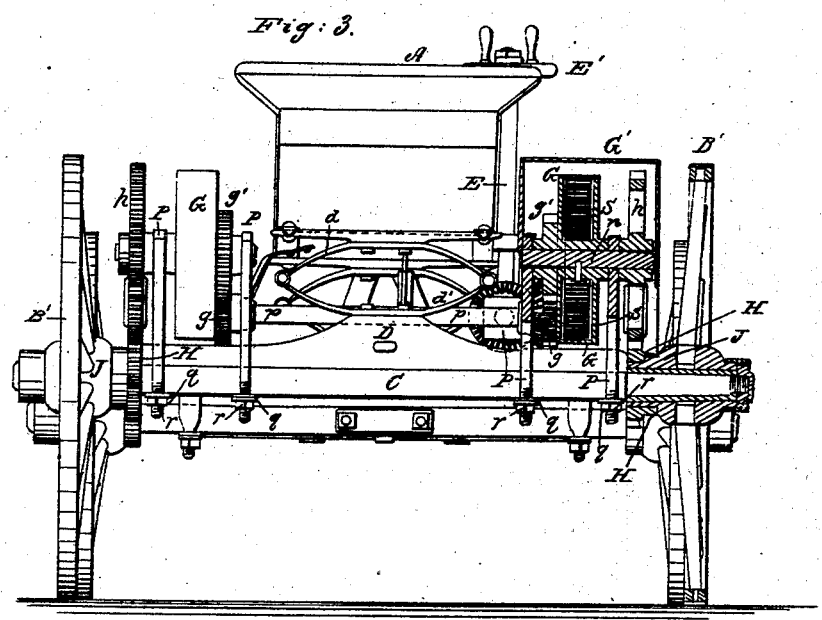
Figure 3 is an elevation of the rear end of the same, showing the propelling-attachment on one side of the body of the vehicle in section.

For the purpose of preventing mud from getting into the gearing, and also for covering the propelling-devices, I use guards G', shown in figs. 1, 2, and 3, which are adapted for being received and held by the standards carrying the said devices, and which can be readily removed when desired to obtain access to these devices.

I am aware that many attempts have been made prior to my invention to propel vehicles on roads by means of springs applied so as to operate upon their transporting-wheels, and therefore I do not desire to be understood as making a broad claim to springs as a motive-power to vehicles.

I have so constructed the propelling-devices that they are applicable to common four-wheel vehicles, and do not require that the vehicle should be made expressly for the purpose of using these devices, and while this is the case, the propelling-devices can be readily detached from a vehicle, should it be required to use a horse for drawing it.

Having described my invention, what I claim as new, and desire to secure by Letters Patent, is—

1. The application of springs S, spring-cases G, spur-wheels g', and spur-wheels h to shafts n, which are supported upon standards P upon the axle C, in combination with spur-wheels applied to the hubs of wheels B', and with means for winding up said springs S, substantially as described.

2. The arrangement of propelling-devices, which I have described, on both sides of the centre of the rear axle C, upon standards P, which can be readily removed from said axle, in combination with the winding-up rod E, applied to and supported by a removable plate, F, substantially as described.

3. In combination with driving-spurs $h$ $h$ and the devices which operate these spurs, I claim brakes $t$ $t$, applied so that they can be caused to act upon said spurs at pleasure, for stopping and starting the vehicle, and regulating the speed thereof, substantially as described.

4. The lever $a^1$ $a^2$, applied to the rod $a$, on the front axle C, and arranged as described, in combination with a catch-plate, R, and a vehicle which is adapted for being propelled, substantially as described.

OSCAR D. PADRICK.

Witnesses:
EDM. H. DAVIS,
JAMES B. McFADDEN.